(12) United States Patent
Baldauf et al.

(10) Patent No.: US 10,753,003 B2
(45) Date of Patent: Aug. 25, 2020

(54) ELECTROCHEMICAL PRODUCTION OF SYNTHESIS GAS

(71) Applicant: Siemens Aktiengesellschaft, Munich (DE)

(72) Inventors: Manfred Baldauf, Erlangen (DE); Marc Hanebuth, Nürnberg (DE); Katharina Stark, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/083,407

(22) PCT Filed: Jan. 25, 2017

(86) PCT No.: PCT/EP2017/051472
§ 371 (c)(1),
(2) Date: Sep. 7, 2018

(87) PCT Pub. No.: WO2017/153082
PCT Pub. Date: Sep. 14, 2017

(65) Prior Publication Data
US 2019/0093241 A1    Mar. 28, 2019

(30) Foreign Application Priority Data

Mar. 10, 2016    (DE) .................. 10 2016 203 947

(51) Int. Cl.
*C25B 1/10*      (2006.01)
*C25B 15/08*     (2006.01)
(Continued)

(52) U.S. Cl.
CPC ............ *C25B 1/10* (2013.01); *B01D 53/1418* (2013.01); *B01D 53/1475* (2013.01);
(Continued)

(58) Field of Classification Search
CPC ......... C25B 1/02–12; C25B 3/04; C25B 1/00; C25B 9/08; C25B 9/18; C25B 15/08; B01D 53/1418; B01D 53/1475; Y02E 60/366

See application file for complete search history.

(56) References Cited

U.S. PATENT DOCUMENTS

| 3,959,094 A | 5/1976 | Steinberg ...................... 205/450 |
| 2009/0289227 A1* | 11/2009 | Rising ................ B01D 53/1475 252/373 |

(Continued)

FOREIGN PATENT DOCUMENTS

| CN | 103119204 A | 5/2013 | ............... C25B 3/00 |
| CN | 103270196 A | 8/2013 | ............... C25B 1/00 |

(Continued)

OTHER PUBLICATIONS

Jones, John-Paul et al., "Electrochemical $CO_2$ Reduction: Recent Advances and Current Trends," Israel Journal of Chemistry, vol. 54, pp. 1451-1466, Sep. 9, 2014.

(Continued)

*Primary Examiner* — Ciel P Contreras
(74) *Attorney, Agent, or Firm* — Slayden Grubert Beard PLLC

(57) ABSTRACT

Various embodiments may include a method of electrochemical production of synthesis gas comprising: reducing carbon dioxide to a first product gas including carbon monoxide in a carbon dioxide electrolysis cell; splitting water to generate a second product gas including hydrogen in a water electrolysis cell; delivering at least one catholyte from the group consisting of: a first catholyte from the carbon dioxide electrolysis cell and a second catholyte from the water electrolysis cell, into a gas scrubbing apparatus; and removing non-reduced carbon dioxide from the first (Continued)

product gas in the gas scrubbing apparatus using the at least one catholyte as an absorbent.

11 Claims, 2 Drawing Sheets

(51) Int. Cl.
*C25B 9/08* (2006.01)
*C25B 1/00* (2006.01)
*C25B 9/18* (2006.01)
*B01D 53/14* (2006.01)
*B01D 53/18* (2006.01)

(52) U.S. Cl.
CPC ............... B01D 53/18 (2013.01); C25B 1/00 (2013.01); C25B 9/08 (2013.01); C25B 9/18 (2013.01); C25B 15/08 (2013.01); Y02E 60/366 (2013.01)

(56) References Cited

U.S. PATENT DOCUMENTS

| 2011/0114504 | A1 | 5/2011 | Sivasankar et al. | 205/455 |
| 2012/0132537 | A1* | 5/2012 | Sivasankar | C25B 3/00 205/439 |
| 2012/0222955 | A1* | 9/2012 | Takeuchi | C25B 1/12 204/257 |
| 2013/0175181 | A1 | 7/2013 | Kaczur | 205/345 |
| 2013/0257061 | A1 | 10/2013 | Ito | 290/1 R |
| 2014/0251822 | A1* | 9/2014 | Bhavaraju | C25B 3/04 205/441 |
| 2015/0057458 | A1 | 2/2015 | Schjodt et al. | 549/510 |
| 2015/0072254 | A1* | 3/2015 | Suzuki | C25B 1/04 429/422 |
| 2015/0114834 | A1 | 4/2015 | Jia et al. | 204/290.11 |
| 2017/0326497 | A1* | 11/2017 | Verbakel | B01D 53/62 |
| 2018/0094196 | A1 | 4/2018 | Wang et al. | |

FOREIGN PATENT DOCUMENTS

| CN | 104364194 A | 2/2015 | C01B 32/40 |
| CN | 104593817 A | 5/2015 | C25B 11/06 |
| CN | 104974780 A | 10/2015 | C01B 3/34 |
| WO | 2017/153082 A1 | 9/2017 | C25B 1/00 |

OTHER PUBLICATIONS

International Search Report and Written Opinion, Application No. PCT/EP2017/051472, 11 pages, dated Mar. 14, 2017.
Chinese Office Action, Application No. 201780015878.4, 8 pages, dated Sep. 2, 2019.

* cited by examiner

ELECTROCHEMICAL PRODUCTION OF SYNTHESIS GAS

CROSS-REFERENCE TO RELATED APPLICATIONS

This application is a U.S. National Stage Application of International Application No. PCT/EP2017/051472 filed Jan. 25, 2017, which designates the United States of America, and claims priority to DE Application No. 10 2016 203 947.4 filed Mar. 10, 2016, the contents of which are hereby incorporated by reference in their entirety.

TECHNICAL FIELD

The present disclosure relates to electrolysis. Various embodiments may include a method and/or an apparatus for production of synthesis gas.

BACKGROUND

The demand for power varies significantly over the course of the day. There is also variation in the generation of power, with an increasing proportion of power available from renewable energies during the course of the day. In order to be able to compensate for an oversupply of power in periods with a lot of sun and strong wind when demand for power is low, controllable power plants or storage means are required to store this energy.

One of the solutions include the conversion of electrical energy to products of value which can especially serve as platform chemicals or synthesis gas which comprises carbon monoxide and hydrogen. One possible technique for conversion of electrical energy to products of value is electrolysis. The electrolysis of water to hydrogen and oxygen is a method known in the prior art. But the electrolysis of carbon dioxide to carbon monoxide has also been a subject of research for a few years, and there are efforts to develop an electrochemical system that can reduce an amount of carbon dioxide in accordance with economic interests.

At present, about 80% of global energy demand is covered by the combustion of fossil fuels, and the processes of combustion thereof cause global emissions of about 34 000 million tons of carbon dioxide into the atmosphere per year. Carbon dioxide is one of the "greenhouse gases", the adverse effects of which on the atmosphere and the climate are a matter of discussion. Utilization of this carbon dioxide is therefore desirable.

An electrolysis unit may include a low-temperature electrolyzer in which carbon dioxide as product gas is metered into a cathode space with the aid of a gas diffusion electrode. The carbon dioxide is reduced to carbon monoxide at a cathode of the electrochemical cell, and water is oxidized to oxygen at an anode. Owing to diffusion limitations at the cathode, use of an aqueous electrolyte can result not only in the formation of carbon monoxide but also in the formation of hydrogen, since the water in the aqueous electrolyte is likewise electrolyzed. In the current state of the art, typically a maximum of 70% of the carbon dioxide used is electrochemically converted. Assuming a conversion level of carbon dioxide of 50% and noting that the Faraday efficiency for carbon monoxide and hydrogen is 50% in each case, the result is a product gas having a composition of carbon monoxide to hydrogen to carbon dioxide in a ratio of 1:1:1.

SUMMARY

A product of value for storage of electrical energy would produce a synthesis gas comprising hydrogen and carbon monoxide with a minimum proportion of carbon dioxide. The teachings of the present disclosure may be embodied in a method and/or apparatus wherein synthesis gas is provided electrochemically with a minimum proportion of carbon dioxide.

For example, some embodiments may include a method of electrochemical production of synthesis gas, comprising the following steps:

reducing carbon dioxide ($CO_2$) to a first product gas (PG) comprising carbon monoxide (CO) in a carbon dioxide electrolysis cell (2) and splitting water (W) to give a second product gas comprising hydrogen ($H_2$) in a water electrolysis cell (40), wherein a first catholyte (K1) is guided from the carbon dioxide electrolysis cell (2) and/or a second catholyte (K2) from the water electrolysis cell (40) into a gas scrubbing apparatus (32), and the first product gas (PG) is freed of non-reduced carbon dioxide ($CO_2$) in the gas scrubbing apparatus (32) by means of the first catholyte (K1) and/or second catholyte (K2) as absorbent.

In some embodiments, the first product gas (PG) and the second product gas are combined.

In some embodiments, the first product gas (PG) and the second product gas are mixed to give a synthesis gas in proportions such that the synthesis gas has a defined CO/$H_2$ ratio within a range between 1:1.4 up to 1:10.

In some embodiments, an aqueous electrolyte (EL) is guided from a regeneration vessel (10) into the carbon dioxide electrolysis cell (2) as the first catholyte (K1) and the first anolyte (A1) and/or into the water electrolysis cell (40) as the second catholyte (K2) and the second anolyte (A2).

In some embodiments, the first and second catholyte (K1, K2) and/or the first and second anolyte (A1, A2) are returned to the common regeneration vessel (10).

In some embodiments, the carbon dioxide ($CO_2$) released in the regeneration vessel (10) is returned to the carbon dioxide electrolysis cell (2).

In some embodiments, the aqueous electrolyte (EL) used is an electrolyte comprising potassium and/or sodium, especially a potassium sulfate.

As another example, some embodiments may include an apparatus (1) for electrical preparation of synthesis gas, comprising: at least one carbon dioxide electrolysis cell (2) for reducing carbon dioxide ($CO_2$) to a first product gas (PG) comprising carbon monoxide (CO), where the carbon dioxide electrolysis cell (2) comprises a first anode space (3) and a first cathode space (4) having a first cathode (6), where a first membrane (5) has been arranged between the first anode space (3) and the first cathode space (4), at least one water electrolysis cell (40) for reducing water (W) to a second product gas comprising hydrogen ($H_2$), comprising a second anode space (54) and a second cathode space (55) having a second cathode (42), where a second membrane (41) has been arranged between the second anode space (54) and the second cathode space (55), and a gas scrubbing apparatus (32) having a third conduit (13) from the first cathode space (4) to the gas scrubbing apparatus (32) and a fourth conduit (14) from the second cathode space (54) to the gas scrubbing apparatus (32).

In some embodiments, there is a regeneration vessel (10) for filling with an aqueous electrolyte (EL).

In some embodiments, there is a first conduit (11) from the regeneration vessel (10) into the carbon dioxide electrolysis cell (2) and/or at least one second conduit (12) from the regeneration vessel (10) into the water electrolysis cell (40).

In some embodiments, the first and/or second cathode (K1, K2) is a gas diffusion electrode.

In some embodiments, there is a fifth conduit (15) from the regeneration vessel (10) to the first cathode space (4) for returning the carbon dioxide ($CO_2$) from the regeneration vessel (10) to the carbon dioxide electrolysis cell (2).

In some embodiments, there is a common separation vessel for anode gas, especially oxygen ($O_2$).

BRIEF DESCRIPTION OF THE DRAWINGS

Further configurations and further features are elucidated in detail by the figures which follow. These are purely illustrative configurations and combinations of features that do not mean any restriction of the scope of protection. Features having the same mode of action and the same designation but in different configurations are given the same reference numerals.

The figures show.

DETAILED DESCRIPTION

Figure 1:
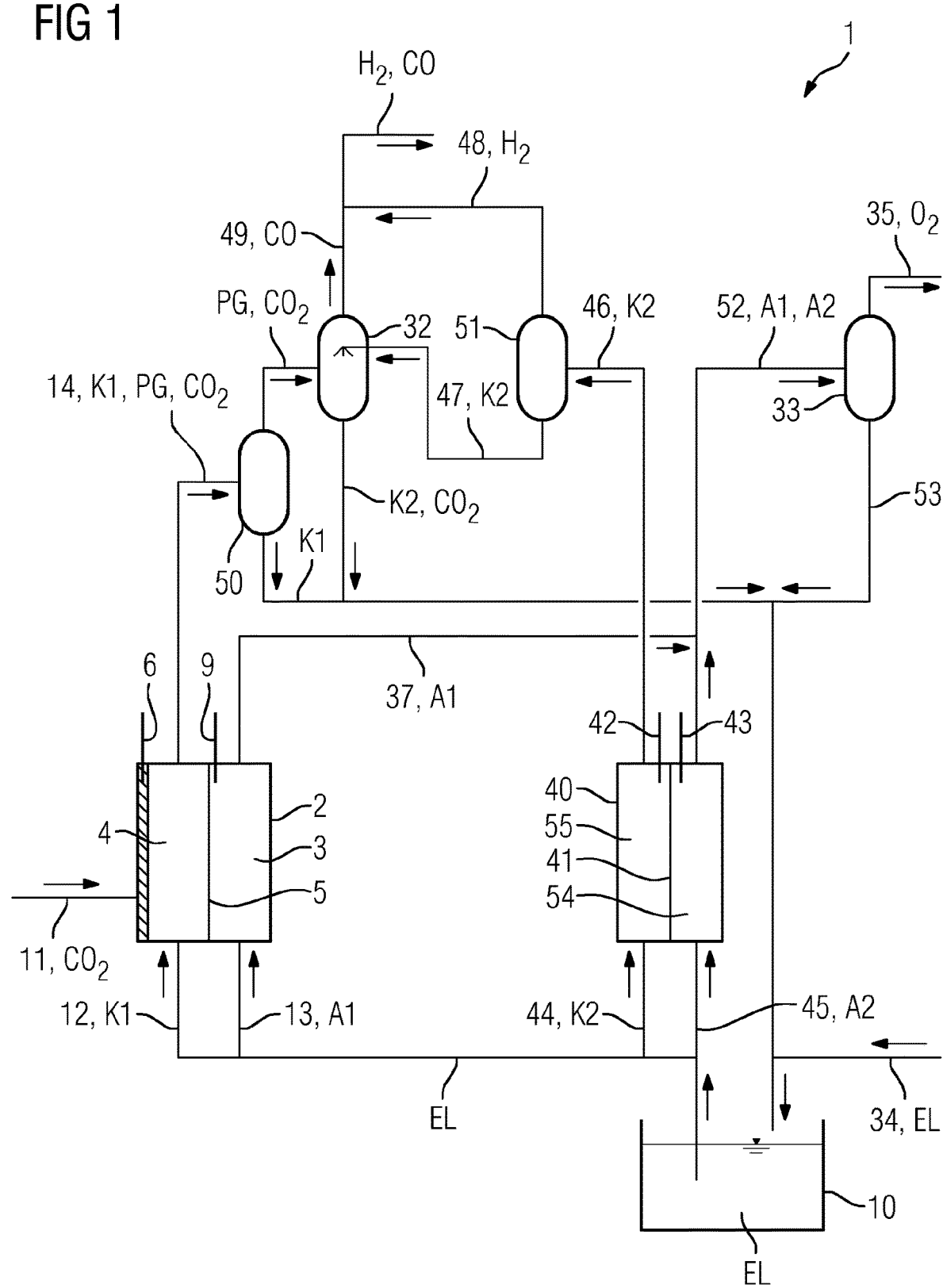
FIG. 1 an electrolysis apparatus comprising a carbon dioxide electrolysis cell and a water electrolysis cell, wherein the first product gas is cleaned by means of the second catholyte, according to teachings of the present disclosure.

The process for electrochemical preparation of synthesis gas comprises multiple steps. First of all, carbon dioxide is reduced to a first product gas comprising carbon monoxide in a first carbon dioxide electrolysis cell. Simultaneously or subsequently, water is dissociated to give a second product gas comprising hydrogen in a second water electrolysis cell. In some embodiments of the present teachings, a first catholyte is guided from the carbon dioxide electrolysis cell and/or a second catholyte from the water electrolysis cell into a gas scrubbing apparatus, and the first product gas is freed of non-reduced carbon dioxide in the second gas scrubbing apparatus by means of the first and/or second catholyte as absorbent.

In some embodiments, an apparatus for electrical preparation of synthesis gas comprises at least one carbon dioxide electrolysis cell for reducing carbon dioxide to a first product gas comprising carbon monoxide, where the carbon dioxide electrolysis cell comprises a first anode space and a first cathode space having a first cathode, where a first membrane has been arranged between the first anode space and the first cathode space. The apparatus further comprises at least one water electrolysis cell for reducing water to a second product gas comprising hydrogen. The water electrolysis cell comprises a second anode space and a second cathode space having a second cathode, where a second membrane has been arranged between the second anode space and the second cathode space. The apparatus of the invention further comprises a third conduit from the first cathode space to the gas scrubbing apparatus and a fourth conduit from the second cathode space to the gas scrubbing apparatus.

In some embodiments, an electrolyzer comprises at least two electrolysis stacks which in turn contain a multitude, especially 100, electrolysis cells. For simplification, the embodiments herein are described in each case with reference to one carbon dioxide electrolysis cell and one water electrolysis cell.

In some embodiments, the first product gas is cleaned with the aid of the absorption in the gas scrubbing apparatus with the aid of the first and/or second catholyte such that the proportion of carbon dioxide which has not been converted in the carbon dioxide electrolysis cell is reduced. The basic aqueous electrolyte is a very good absorbent for the carbon dioxide. In the gas scrubbing apparatus, the first product gas may be cleaned with the first and/or second catholyte, and so the use of an additional absorbent may be avoided. The cleaning of the first product gas enables the preparation of a pure synthesis gas comprising carbon monoxide and hydrogen.

In some embodiments, the use of the first and/or second catholyte as absorbent is enabled by a change in the pH of the respective catholyte solutions during the electrolysis. The pH values of the first and/or second catholyte each become basic during the electrolysis in the respective electrolysis cell. The basis of this effect is that, during the electrolysis, cations that are not protons permeate through the membrane from the anolyte into the catholyte. These cations include predominantly cations of the conductive salt in the electrolyte, especially in an aqueous electrolyte solution such as an aqueous potassium sulfate solution or an aqueous potassium hydrogencarbonate solution. This pH effect is particularly large when the first and/or second catholyte comprises virtually no carbon dioxide, if any. The carbon dioxide leads to formation of potassium hydrogencarbonate, which keeps the pH virtually constant, i.e. has a buffering effect, since it binds the hydroxide ions within the catholyte. In the water electrolysis cell in particular, there is no carbon dioxide, and so the pH of the second catholyte becomes strongly basic. But in the carbon dioxide electrolysis cell, the carbon dioxide can be guided separately from the catholyte, such that the carbon dioxide is merely reduced at a gas diffusion electrode and the catholyte here too has virtually no contact with carbon dioxide and becomes basic. In that case, the carbon dioxide can be introduced into the carbon dioxide electrolysis cell at an elevated pressure compared to the first catholyte in order to further minimize contact.

In some embodiments, the first product gas comprising carbon monoxide and the second product gas comprising hydrogen can be combined to give a common product gas, i.e. synthesis gas. But it is also possible not to combine the first and second product gases until they are within the reactor. In that case, it is possible to meter these gases section by section into different sections of the reactor in a defined ratio. In some embodiments, it is thus possible to achieve higher selectivities or yields in one reactor. By comparison with the conventional preparation of a synthesis gas from fossil sources, the establishment of any desired ratio of carbon monoxide to hydrogen is thus possible.

In some embodiments, the first product gas and the second product gas are mixed to give a synthesis gas in proportions such that the synthesis gas has a defined $CO/H_2$ ratio within a range between 1:1.4 and 1:10, especially between 1:1.4 and 1:3. In some embodiments, it is possible to prepare the hydrogen and the carbon dioxide independently in the two electrolysis cells. It is possible to fix the ratio of carbon monoxide to hydrogen via the choice of dimensions of the respective electrolyzers, for example via the number of electrolysis cells. In some embodiments, precise adjustment to a target value is possible with the aid of the choice of the electrolysis voltage in the respective electrolysis cell. Especially in the case of the carbon dioxide electrolysis cell, it is known that, depending on the voltage and consequently also the current, not only carbon monoxide but also hydrogen is prepared. It is therefore possible here to choose the voltage or current such that carbon monoxide in particular is produced.

In some embodiments, an aqueous electrolyte is guided into the first carbon dioxide electrolysis cell as a first catholyte and a first anolyte. In some embodiments, the aqueous electrolyte is guided into the second water electrolysis cell as a second catholyte and a second anolyte. In that case, the apparatus especially comprises a regeneration vessel for the electrolyte. In some embodiments, the apparatus further comprises at least one conduit from the regeneration vessel into the carbon dioxide electrolysis cell and at least one second conduit from the regeneration vessel into the water electrolysis cell.

In some embodiments, the utilization of a common electrolyte in the carbon dioxide electrolysis cell and the water electrolysis cell means that just one electrolyte circuit is required. Just one regeneration vessel is also required. The apparatus complexity of the operation of the two electrolysis cells is thus reduced. The size of the regeneration vessel in relation to the pumped circulation rate of the electrolyte may in the optimal case even be sufficiently small that a regeneration vessel volume is virtually zero, and hence no regeneration vessel is needed. In this case, the internal volume of the pipelines is sufficient to compensate for any fluctuations in the electrolyte.

In some embodiments, the first and second catholytes and/or the first and second anolytes are recycled into the regeneration vessel. In this regeneration vessel, the pH of the first and second anolytes and of the first and second catholytes are balanced out, especially to a pH within the range from 8 to 10, and the carbon dioxide stored in the catholyte absorbent is also released. This carbon dioxide can then be returned back to the carbon dioxide electrolysis cell. This allows the conversion of the carbon dioxide in the carbon dioxide electrolysis cell to be increased.

In some embodiments, the aqueous electrolyte used is an aqueous electrolyte comprising potassium and/or ammonium. More particularly, potassium sulfate may be used as a conductive salt.

In some embodiments, in that case, the potassium cation of the anolyte migrates through the membrane of the into the catholyte during the electrolysis, such that the catholyte becomes basic and the anolyte becomes acidic. This assists the propensity of the catholyte to act as an absorbent for carbon dioxide. More particularly, the conductive salt of the aqueous electrolyte is present in concentrations in the range from 0.5 mol/L to 1 mol/L.

In some embodiments, the first and/or second cathode is a gas diffusion electrode. In the carbon dioxide electrolysis cell, the first cathode is then capable of separating the catholyte from the reactant gas, the carbon dioxide, to such an extent that the carbon dioxide in the catholyte no longer contributes to any buffering effect. Thus, the pH effect in the catholyte is assisted, which improves the properties of the catholyte as an absorbent.

In some embodiments, the apparatus comprises a fifth conduit from the regeneration vessel to the first cathode space for returning the carbon dioxide from the regeneration vessel to the carbon dioxide electrolysis cell. The carbon dioxide released in the regeneration vessel is thus in turn rendered utilizable in the carbon dioxide electrolysis cell. This may increase the conversion of carbon dioxide in the carbon dioxide electrolysis cell.

In some embodiments, the apparatus comprises a common separation vessel for the carbon dioxide electrolysis cell and the water electrolysis cell for the respective anode gases, especially for oxygen. In some embodiments, oxygen is produced as anode gas in both electrolysis cells. This oxygen can be separated from the anolyte in the common separation vessel. After this removal, the anolyte can be recycled back into the regeneration vessel.

As shown in the Figure, the electrolysis apparatus 1 comprises a carbon dioxide electrolysis cell 2. The carbon dioxide electrolysis cell 2 comprises a first anode space 3 and a first cathode space 4. The first anode space 3 and the first cathode space 4 are separated from one another by a first membrane 5. The first cathode space 4 comprises a first cathode 6. The first anode space comprises a first anode 9. In this example, the anode 9 has been applied directly to the first membrane 5. But it is likewise possible to arrange the first anode 9 within the anode space 3. In some embodiments, in the case of application of the anode 9 to the membrane 5, the required volume of the first anolyte A1 is reduced.

In some embodiments, the water electrolysis cell 40 comprises a second anode space 54 and a second cathode space 55 which are separated from one another by a second membrane 41. The second cathode space 55 comprises a second cathode 42 and the second anode space 54 comprises a second anode 43.

In some embodiments, the carbon dioxide electrolysis cell 2 and the water electrolysis cell 40 are supplied with an aqueous electrolyte EL from a common regeneration vessel 10. The aqueous electrolyte EL may be supplied to regeneration vessel 10 from an inlet 34. The aqueous electrolyte EL is guided via a second conduit 12 as a first catholyte K1 into the first cathode space 4 and via a third conduit 13 as a first anolyte A1 into the first anode space 3. It is additionally guided as a second catholyte K2 and as a second anolyte A2 into the second cathode space 55 and into the second anode space 54 of the water electrolysis cell 40.

In some embodiments, the two electrolysis cells are supplied with voltage, so that an electrolysis can take place. During the electrolysis, carbon dioxide $CO_2$ is fed into the carbon dioxide electrolysis cell 2 via a first conduit 11. In the carbon dioxide electrolysis cell 2, this carbon dioxide $CO_2$ is reduced to carbon monoxide CO. Depending on the voltage, not only carbon monoxide CO but also hydrogen $H_2$ is formed. In addition, the carbon dioxide $CO_2$ is not fully converted, and so not only the product gas comprising PG comprising carbon monoxide CO but also carbon dioxide $CO_2$ and hydrogen leave the carbon dioxide electrolysis cell 2. More particularly, the voltage in this working example is chosen such that the hydrogen content in the first product gas PG from the carbon dioxide electrolysis cell 2 is at a minimum. More particularly, a voltage of less than 3 V, further preferably less than 2.5 V, is applied.

At the same time, in the water electrolysis cell 40, water W is dissociated to hydrogen $H_2$ and oxygen $O_2$. The hydrogen $H_2$ leaves the second cathode space 55 of the water electrolysis cell 40 via a seventeenth conduit 46. The second catholyte K2 also leaves the second cathode space 55 of the water electrolysis cell 40 via the seventeenth conduit 46. In a fourth removal apparatus 51, the second catholyte K2 and the hydrogen $H_2$ are separated from one another.

In some embodiments, the first product gas PG, carbon dioxide $CO_2$ and hydrogen $H_2$ separated are guided out of the carbon dioxide electrolysis cell 2 into the third removal apparatus 50. The first catholyte K1 is separated therein from the gas phase comprising the first product gas PG, carbon dioxide $CO_2$ and hydrogen $H_2$. The first product gas PG comprising carbon monoxide CO, the carbon dioxide $CO_2$ and the hydrogen $H_2$ are guided into a gas scrubbing apparatus 32. They are contacted therein with the catholyte K2 from the water electrolysis cell 40. The second catholyte K2 is then used to separate the unconverted carbon dioxide $CO_2$ in the product gas PG from the carbon dioxide electrolysis cell 2.

In some embodiments, the second catholyte K2 is guided together with the hydrogen H2 from the water electrolysis cell 40 through a seventeenth conduit 46 into the fourth removal apparatus 51. In the fourth removal apparatus 51, the hydrogen H2 was separated from the second catholyte K2. The hydrogen 112 is guided from the fourth removal apparatus 51 through a line 48 to any of many possible uses. The second catholyte K2 is subsequently guided via an eighteenth conduit 47 into the gas scrubbing apparatus 32. The second catholyte K2 is used therein as absorbent for the non-reduced carbon dioxide $CO_2$ from the carbon dioxide electrolysis cell 2. This is possible especially because the second catholyte K2 has become basic during the electrolysis of the water W in the water electrolysis cell 40. The use of a non-buffering aqueous electrolyte, e.g. a potassium sulfate, brings about a change in pH in the electrolysis cell. During the electrolysis, cations that are not protons, e.g. potassium, migrate across the second membrane 41. This makes the pH of the second anolyte A2 acidic, and that of the second catholyte K2 basic. This basic catholyte K2 is of very good suitability as absorbent for carbon dioxide $CO_2$.

In the gas scrubbing apparatus 32, the second catholyte K2 is thus contacted with the non-reduced carbon dioxide $CO_2$. In some embodiments, there may be a maximum contact area between the two phases. For this purpose, one option is to spray the second catholyte K2 in the gas scrubbing apparatus 32. In some embodiments, random packings are present in the gas scrubbing apparatus 32 or that the gas scrubbing apparatus 32 has a structured packing. Further chemical engineering measures are likewise conceivable for increasing the surface area in the gas scrubbing apparatus 32.

The carbon dioxide $CO_2$ absorbs in the second catholyte K2 and is guided together with the second catholyte K2 back into the regeneration vessel 10. The cleaned product gas from the carbon dioxide electrolysis cell 2, namely virtually pure carbon monoxide CO, can subsequently be mixed with the hydrogen from the water electrolysis cell 40 in a ratio which requires a subsequent reaction. It is likewise possible to add the two gases separately from one another at different points in a reactor. In this way, it is possible to optimize the selectivity of a reaction.

The anode gases in the two electrolysis cells are oxygen $O_2$. They are combined together with the first anolyte A1 from a line 37 and the second anolyte A2 in a line 52 and feed to a second removal apparatus 33. In the second removal apparatus 33, the oxygen $O_2$ is removed and guided out of the electrolysis apparatus 1 via a twelfth conduit 35. The anolytes A1 and A2 are likewise returned to the regeneration vessel 10.

Figure 2:
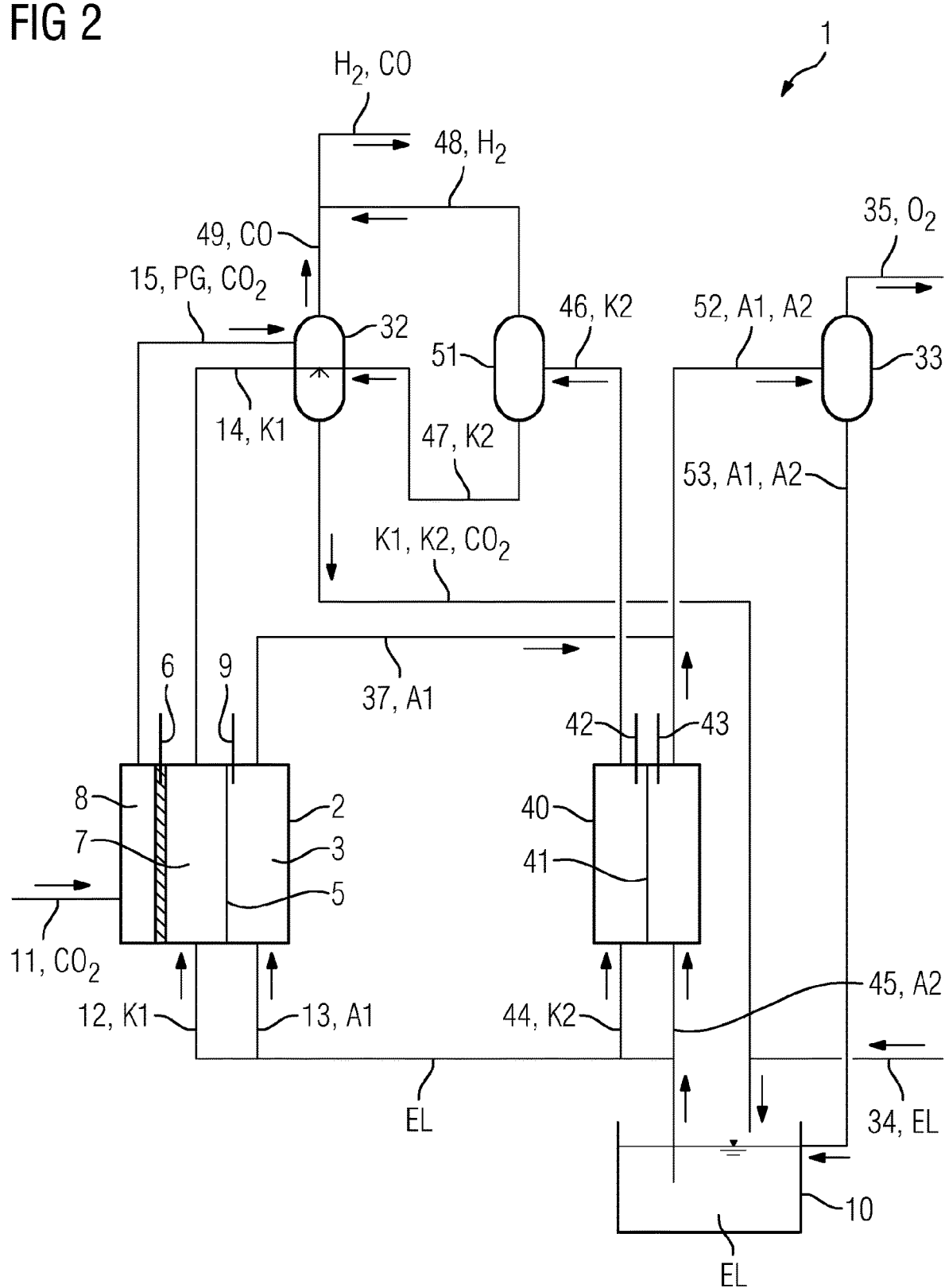
FIG. 2 an electrolysis apparatus comprising a carbon dioxide electrolysis cell and comprising a water electrolysis cell, wherein the first product gas is cleaned by means of the first and second catholytes, according to teachings of the present disclosure.

FIG. 2 shows a further working example of the electrolysis apparatus 1. In this second working example, the unconverted carbon dioxide is cleaned both with the first catholyte and with the second catholyte as absorbent. This electrolysis apparatus 1 comprises a carbon dioxide electrolysis cell 2 and a water electrolysis cell 40. However, the construction of the carbon dioxide electrolysis cell 2 differs from the construction of the carbon dioxide electrolysis cell 2 from the first example. The carbon dioxide electrolysis cell 2 in the second working example comprises a membrane 5 having a first anode 9, a first anode space 3, a cathode subspace 7 and a second cathode subspace 8. The first and second cathode subspaces 7, 8 are separated from one another by a first cathode 6, especially a gas diffusion electrode.

The separating of the first catholyte K1 from the product gas and reactant gas is possible since the carbon dioxide $CO_2$ is conducted past the first cathode 6 into the second cathode subspace 8 separately from the first catholyte K1 present in the first cathode subspace 7. The reaction of the carbon dioxide $CO_2$ to give carbon monoxide CO takes place at the first cathode 6 in contact with the first catholyte K1. A small pressure differential between the carbon dioxide $CO_2$ and the first catholyte K1, the relative pressure of the carbon dioxide $CO_2$ being somewhat greater, means that the first catholyte K1 remains virtually completely within the first cathode subspace 7. Typically, the gaseous components of the reaction then leave the carbon dioxide electrolysis cell 2 via the fifth conduit 5 from the second cathode subspace 8, and the first catholyte K1 leaves via a fourth conduit 14 from the first cathode subspace 7.

The water electrolysis cell 40 comprises a second membrane 41, a second cathode 42 and a second anode 43. The water electrolysis cell 40 also appropriately requires a voltage source. An electrolyte EL is stored in a regeneration vessel 10. This electrolyte EL is guided both into the carbon dioxide electrolysis cell 2 and into the water electrolysis cell 40. The first catholyte K1 and the first anolyte A1 are guided via a second conduit 12 and a third conduit 13 into the carbon dioxide electrolysis cell 2. The electrolyte EL is guided as a second catholyte K2 through a fifteenth conduit 44 and as a second anolyte A2 through a sixteenth conduit 45 into the water electrolysis cell 40.

In the water electrolysis cell 40, hydrogen $H_2$ is produced at the second cathode 42 and oxygen $O_2$ at the second anode 43. The hydrogen $H_2$ leaves the water electrolysis cell 40 together with the second catholyte K2 via a seventeenth conduit 46. In a fourth removal apparatus 51, the hydrogen $H_2$ is separated from the second catholyte K2.

The second catholyte K2 is guided through an eighteenth conduit 47 to the gas scrubbing apparatus 32. The first catholyte K1 is likewise guided to the gas scrubbing apparatus 32. The first product gas PG comprising the non-reduced carbon dioxide $CO_2$ is guided via a fifth conduit 15 from the carbon dioxide electrolysis 2 into the gas scrubbing apparatus 32. The first catholyte K1 and the second catholyte K2 are used therein as absorbent for the carbon dioxide $CO_2$. The carbon dioxide $CO_2$ is absorbed in the first and second catholytes K1, K2, and so the product gas PG is virtually free of carbon dioxide $CO_2$.

The cleaned product gas PG which especially comprises carbon monoxide CO leaves the gas scrubbing apparatus 32 via a twentieth conduit 49. The carbon monoxide CO is mixed with hydrogen $H_2$ from the water electrolysis cell 40. This gives rise to a synthesis gas. In some embodiments, the ratio of carbon monoxide CO to hydrogen $H_2$ can be adjusted.

The first and second anolytes A1, A2 are guided back into the regeneration vessel 10 through a line 53. The first and second catholytes K1, K2 laden with the carbon dioxide $CO_2$ are returned to the regeneration vessel 10. The electrolyte is regenerated therein. The pH of the two anolytes A1 and A2 and the two catholytes K1 and K2 is balanced out to a pH range between 8 and 10. The absorbed carbon dioxide $CO_2$ is released and can be guided back into the carbon dioxide electrolysis cell 2.

The first and second anolytes A1, A2 are guided back into the regeneration vessel 10. The first and second catholytes K1, K2 laden with the carbon dioxide $CO_2$ are returned to the regeneration vessel 10. The electrolyte is regenerated therein. The pH of the two anolytes A1 and A2 and the two catholytes K1 and K2 is balanced out to a pH range between 8 and 10. The absorbed carbon dioxide $CO_2$ is released and can be guided back into the carbon dioxide electrolysis cell 2.

What is claimed is:

1. A method of electrochemical production of synthesis gas, the method comprising:
    delivering an aqueous electrolyte from a regeneration vessel into both (a) a carbon dioxide electrolysis cell as a first catholyte and a first anolyte and (b) a water electrolysis cell as a second catholyte and a second anolyte;
    receiving carbon dioxide in the carbon dioxide electrolysis cell;
    at the carbon dioxide electrolysis cell, reducing a portion of the carbon dioxide to a first product gas including carbon monoxide and unconverted carbon dioxide;
    outputting the first product gas from the carbon dioxide electrolysis cell;
    at the water electrolysis cell, performing an electrolysis process to split water to separate hydrogen from oxygen in the water electrolysis cell, wherein the electrolysis process results in a reduced-pH second catholyte;
    outputting a second product gas including the separated hydrogen and the reduced-pH second catholyte from the water electrolysis cell;
    separating the hydrogen from the second product gas;
    delivering (a) the reduced-pH second catholyte and (b) the first product gas including carbon monoxide and unconverted carbon dioxide into a gas scrubbing apparatus;
    removing at least a portion of the unconverted carbon dioxide from the first product gas in the gas scrubbing apparatus using at least the reduced-pH second catholyte as an absorbent;
    delivering the reduced-pH second catholyte with the removed portion of unconverted carbon dioxide back to the regeneration vessel; and
    mixing (a) the hydrogen separated from the second product gas and (b) the carbon monoxide output from the gas scrubbing apparatus to create a synthesis gas.

2. The method as claimed in claim 1, wherein the synthesis gas has a defined $CO/H_2$ ratio within a range from 1:1.4 to 1:10.

3. The method as claimed in claim 1, wherein the first catholyte and the second catholyte are returned to the regeneration vessel.

4. The method as claimed in claim 1, further comprising returning carbon dioxide released in the regeneration vessel to the carbon dioxide electrolysis cell.

5. The method as claimed in claim 1, wherein the aqueous electrolyte comprises at least one of: potassium or sodium.

6. The method as claimed in claim 1, wherein the first anolyte and a second anolyte are returned to the regeneration vessel.

7. The method as claimed in claim 1, further comprising:
    outputting the first catholyte from the carbon dioxide electrolysis cell;
    delivering the first catholyte output from the carbon dioxide electrolysis cell to the gas scrubbing apparatus;
    using both the first catholyte and the second catholyte as adsorbents in the gas scrubbing apparatus for removing unconverted carbon dioxide from the first product gas.

8. An apparatus for electrical preparation of a synthesis gas, the apparatus comprising:
    a regeneration vessel holding an aqueous electrolyte;
    a first conduit for delivering the aqueous electrolyte to a carbon dioxide electrolysis cell;
    a second conduit for delivering the aqueous solution to a water electrolysis cell;
    wherein the carbon dioxide electrolysis cell is configured for receiving carbon dioxide, receiving the aqueous electrolyte via the first conduit as a first catholyte and a first anolyte, reducing a portion of the carbon dioxide to a first product gas including carbon monoxide and unconverted carbon dioxide, and outputting the first product gas;
    wherein the carbon dioxide electrolysis cell comprises a first anode space, a first cathode space having a first cathode, and a first membrane arranged between the first anode space and the first cathode space;
    wherein the water electrolysis cell is configured for receiving the aqueous electrolyte via the second conduit as a second catholyte and a second anolyte, reducing water to a second product gas including hydrogen and the second catholyte, and outputting the second product gas;
    wherein the water electrolysis cell comprises a second anode space, a second cathode space having a second cathode, and a second membrane arranged between the second anode space and the second cathode space;
    a hydrogen separator configured for separating the hydrogen from the second product gas;
    a gas scrubber;
    a first conduit configured for delivering the first product gas including carbon monoxide and unconverted carbon dioxide from the first cathode space to the gas scrubber; and
    a second conduit configured for delivering the reduced-pH second catholyte from the second cathode space to the gas scrubber;
    wherein the gas scrubber is configured to remove at least a portion of the unconverted carbon dioxide from the first product gas using at least the reduced-pH second catholyte as an absorbent;
    a return conduit configured for delivering the reduced-pH second catholyte with the removed portion of unconverted carbon dioxide back to the regeneration vessel; and
    a mixing apparatus for mixing the hydrogen separated from the second product gas with the carbon monoxide output from the gas scrubbing apparatus to create a synthesis gas.

9. The apparatus as claimed in claim 8, wherein at least one of the first cathode or the second cathode comprises a gas diffusion electrode.

10. The apparatus as claimed in claim 8, further comprising a carbon dioxide conduit from the regeneration vessel to the first cathode space for returning carbon dioxide from the regeneration vessel to the carbon dioxide electrolysis cell.

11. The apparatus as claimed in claim 8, further comprising a common separation vessel for anode gas.

* * * * *